Dec. 14, 1926.

A. A. ROSS 1,610,886

LUBRICATING ARRANGEMENT FOR GEARING

Filed May 28, 1923  3 Sheets-Sheet 1

Inventor:
Aubrey A. Ross,
by
His Attorney.

Dec. 14, 1926.

A. A. ROSS 1,610,886

LUBRICATING ARRANGEMENT FOR GEARING

Filed May 28, 1923  3 Sheets-Sheet 2

Fig. 4.ª

Inventor:
Aubrey A. Ross,
by
His Attorney.

Dec. 14, 1926. 1,610,886
A. A. ROSS
LUBRICATING ARRANGEMENT FOR GEARING
Filed May 28, 1923 3 Sheets-Sheet 3

Inventor:
Aubrey A. Ross,
by
His Attorney.

Patented Dec. 14, 1926.

1,610,886

UNITED STATES PATENT OFFICE.

AUBREY A. ROSS, OF SCHENECTADY, NEW YORK, ASSIGNOR TO GENERAL ELECTRIC COMPANY, A CORPORATION OF NEW YORK.

LUBRICATING ARRANGEMENT FOR GEARING.

Application filed May 28, 1923. Serial No. 641,893.

The present invention relates to gearing of the so-termed "self-lubricating" or "self-oiling" type, that is, a gearing wherein the means for effecting lubrication of the gearing is operated by and forms in substance a part of the gearing unit, and has for its object to provide an improved construction and arrangement in a gearing of this character.

For a consideration of what I believe to be novel and my invention, attention is directed to the accompanying description and the claims appended thereto.

Figure 1:
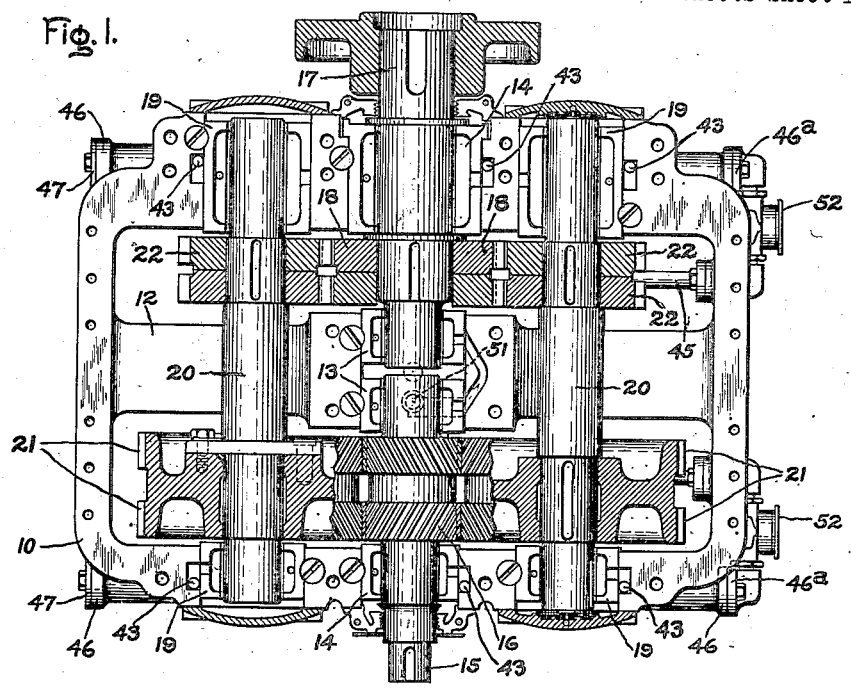
Figure 2:
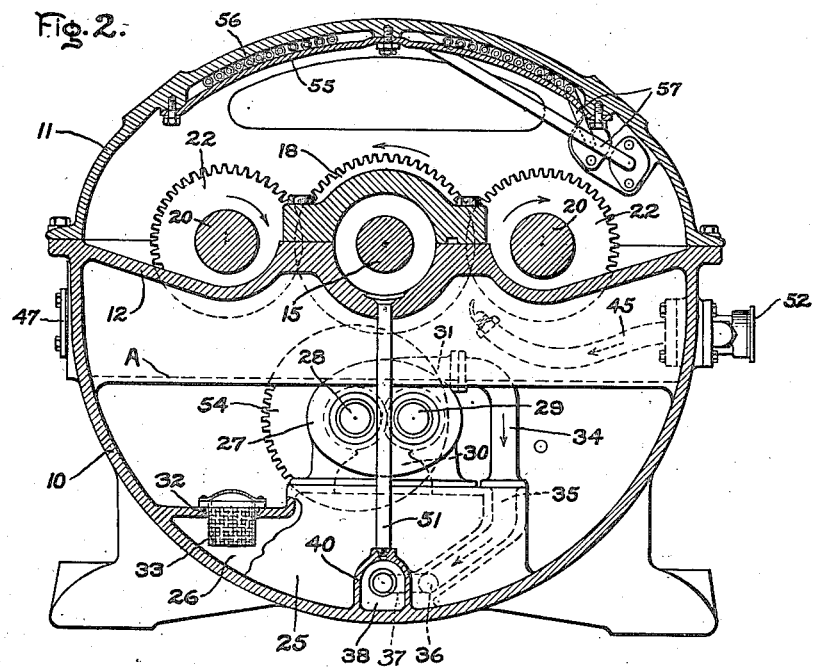
Figure 3:
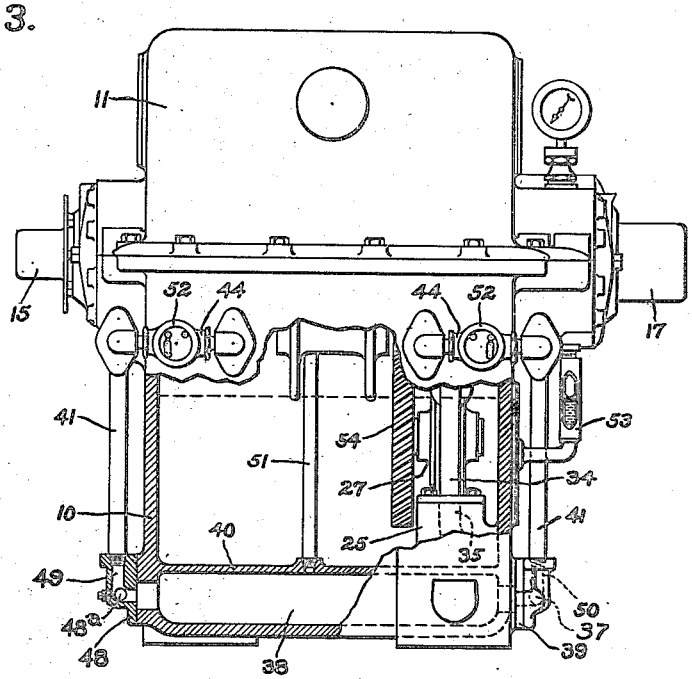
Figure 4:
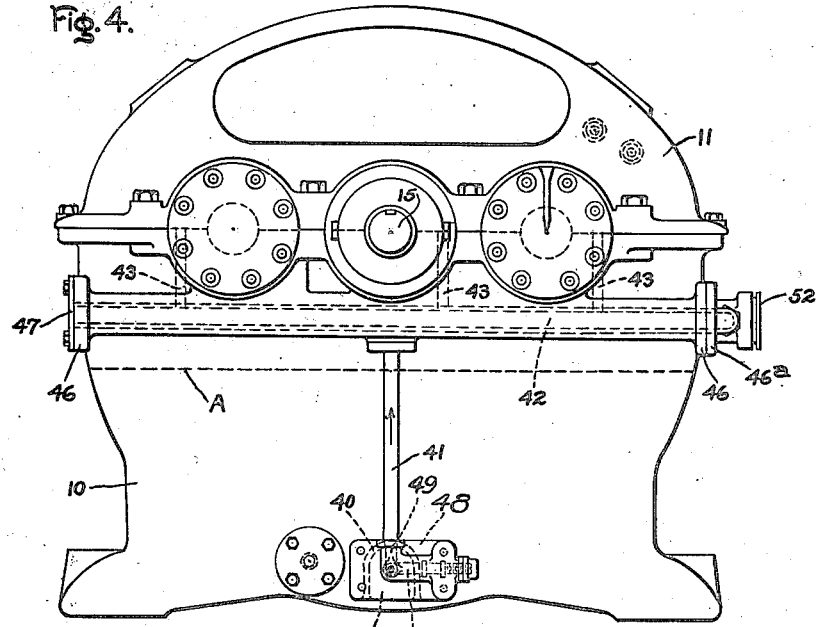
Figure 4:
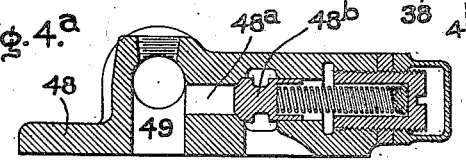
Figure 5:
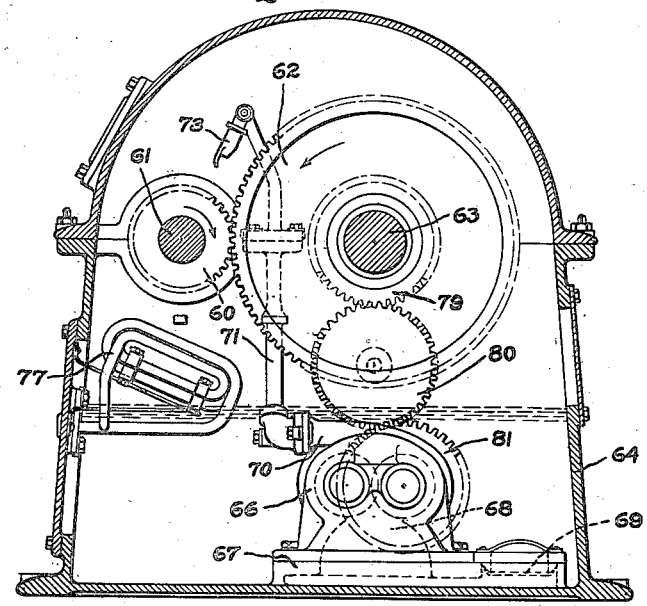
Figure 6:
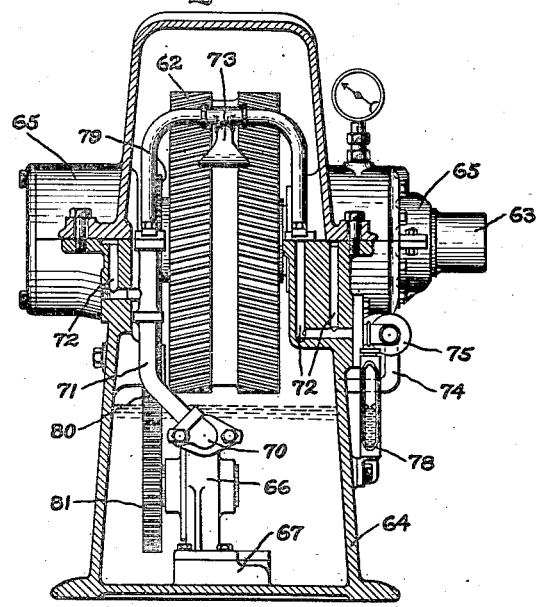

In the drawing, Fig. 1 is a plan view of a gearing embodying my invention; Fig. 2 is a transverse sectional view; Fig. 3 is a side elevation with the casing partly broken away; Fig. 4 is an end elevation; Fig. 4$^a$ is a detail sectional view of a pressure relief valve; Fig. 5 is a transverse sectional view of a modification, and Fig. 6 is a longitudinal sectional view thereof.

Referring first to Figs. 1 to 4 inclusive, 10 indicates the lower portion of a gear casing and 11 the cover or top portion. Extending across the central portion of the casing is a web 12 which forms a support for bearings 13 and mounted in bearings 13 and adjacent cooperating bearings 14 in the end walls of the casing is a high speed shaft 15 which carries a pinion 16 and a low speed shaft 17 which carries a gear wheel 18. Journaled in the end walls of the casing in suitable bearings 19 are shafts 20 upon which are mounted high speed gear wheels 21 and low speed pinions 22 for transmitting power between pinion 16 and gear wheel 18, thus forming a double reduction gearing. This gearing arrangement may be taken as typical of any suitable gearing to which my invention may be applied.

According to the embodiment of my invention illustrated in Figs. 1 to 4 inclusive, I provide in the bottom of the gear casing at one end thereof suitable walls 25 which define a lubrication chamber 26 and which present a top flat surface upon which is mounted a lubricating pump 27. Preferably I employ a rotary pump, a known type of gear pump being illustrated. It comprises shafts 28 and 29 on which are arranged meshing gear wheels located in the pump casing which perform the pumping operation in the well understood manner. The suction inlet to the pump is indicated at 30 and the discharge conduit at 31. Suction inlet 30 connects directly with lubricating chamber 26. The main supply of lubricant is contained directly in the bottom of the gear casing, the level being indicated by the dotted lines A in Figs. 2 and 4 and chamber 26 is kept filled from this supply through an opening 32 in which is arranged a strainer 33. Discharge conduit 31 is connected by a pipe 34 to a passage 35 formed by suitable walls integral with walls 25. Passage 35 is inside chamber 26 but does not connect therewith. The lower end of passage 35 connects with an opening 36 in an end wall of the gear casing and this opening is connected by a passage 37 with a conduit 38 which extends from end to end of the gear casing. Passage 37 is formed in a plate 39 which is bolted to the end wall of the casing. Conduit 38 is defined by a wall 40 formed integral with the bottom of the gear casing. It will thus be seen that when lubricant pump 27 is running it takes lubricant from chamber 26 and supplies it to conduit 38. From conduit 38 lubricant is supplied to the various parts requiring lubrication. At its two ends it is connected by vertical pipes 41 to lubricant passages 42 which extend along the ends of the casing and supply lubricant through passages 43 to the bearings located in the end walls and through pipes 44 to spoon oilers 45 which lubricate the gear teeth. Passages 42 and 43 are preferably formed directly in the casing wall, being located directly beneath the bearing hubs in a thickened portion of the casing. They may be in the form of pipes cast directly in the end walls. At their ends the walls forming passages 42 are provided with flanges 46 to which at the one end are bolted the elbows 46$^a$ on pipes 44, and at the other end cover plates 47. Pipes 41 are located outside the gear casing as shown in Fig. 3, the left hand pipe being detachably connected to the gear casing by a removable plate 48 having a passage 49 therein which connects the pipe to conduit 38, and the right hand pipe being connected to detachable plate 39 which is provided with a passage 50 connecting the pipe to conduit 38. At 51 (Figs. 1 and 2) is a pipe which conveys lubricant from conduit 38 to the middle bearings 13 supported on web 12. In plate 48 is a by-pass conduit 48$^a$ which connects passage 49 to the gear casing beyond conduit 38 and is normally closed by a spring pressed valve 48$^b$ (see Fig. 4$^a$). In case of excess pressure in the lubricating system valve 48$^b$ is forced open to permit escape of lubricant through by-pass conduit 48$^a$ to the gear casing. In pipes 44 are sight flow indicators 52 for indicating flow of lubricant to the spoon oilers and at 53 is a gauge which shows the lubricant level in the gear casing.

The lubricant pump 27 is driven from the gearing, preferably the low speed shaft, and to this end a gear wheel 54 is fixed on the end of pump shaft 28 and meshes directly with low speed gear wheel 18. With this arrangement whenever the gearing is running, the lubricant pump is operated to supply lubricant to the various parts requiring lubrication.

Fastened to the inner surface of cover 11 by one or more suitable straps 55 is a cooling coil 56 provided with admission and discharge pipes 57. Cooling medium such as water is circulated through this coil.

In operation, whenever the gearing is running the lubricant pump is driven to supply oil from chamber 26 to the bearings and the spoon oilers 45. The spoon oilers supply oil to the right hand side of the gearing at which point the gear wheels 18 and 22, turning in the directions of the arrows, move upward. The oil from these gear wheels is thrown upward in the form of a fine spray into engagement with the cooling coil 56 from which it drops back into the bottom of the casing, a part of it falling on the left hand portion of the gearing to lubricate it. The gearing is thus thoroughly lubricated and the lubricant cooled. Since the lubricant pump is submerged in the supply of lubricant, it is always primed and ready to operate.

In Figs. 5 and 6 I have shown my invention in connection with a single reduction gearing comprising a pinion 60 mounted on a shaft 61 and meshing with a gear wheel 62 mounted on a shaft 63. Shafts 61 and 63 are suitably journaled in the end walls of the gear casing 64, the bearings for shaft 63 being shown at 65. The lubricant pump 66 is mounted on the bottom of casing 64 on a hollow pedestal 67 and its suction inlet 68 communicates with the lubricant supply in the gear casing through the interior of pedestal 67 and a suitable strainer 69. The discharge conduit 70 of pump 66 is connected to a pipe 71 which conveys lubricant to passages 72 which lead to the bearings and to a spoon oiler 73. At 74 is a return pipe for conveying the excess lubricant back to the gear casing, there being a suitable pressure relief valve therein indicated at 75. At 77 is a cooling coil which performs the same function as does the coil 56 in Figs. 1 to 4 and at 78 is a liquid level indicator for the lubricant in the gear casing.

In this arrangement the lubricant pump 66 is driven from the low speed shaft 63 by a small gear wheel 79 which is mounted on shaft 63 and drives the pump through an idler gear wheel 80 and a gear wheel 81 mounted on one of the pump shafts.

The operation of the arrangement shown in Figs. 5 and 6 is similar to that of the arrangement of Figs. 1 to 4, the pump being submerged so it is self-priming and operating whenever the gearing is running.

By my invention I provide a self-oiling gearing which is simple in structure, compact, and in which a positive pump means is provided for forcing lubricant to the parts requiring lubrication.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a gearing, the combination of a casing adapted to contain a supply of lubricant in the bottom thereof, intermeshing gear wheels mounted in the casing above the lubricant level, bearings for the gear wheels, a lubricant pump mounted in the casing below the lubricant level with its suction side communicating with the interior of the casing below the lubricant level, means for delivering lubricant from the discharge side of the pump to the bearings and to the meshing teeth of the gear wheels, means within the casing for effecting cooling of the lubricant, the point of application of lubricant to the gear wheels being such that it is directed therefrom by rotation against the cooling means and a gearing for driving the pump directly from one of the gear wheels.

2. In a gearing, the combination of a casing adapted to contain a supply of lubricant in the bottom thereof, intermeshing gear wheels mounted in the casing above the lubricant level, bearings for the gear wheels, walls supported on the bottom of the casing which form a chamber communicating with the casing interior below the lubricant level, a lubricant pump mounted on said walls and having its suction side connected with said chamber, means for delivering lubricant from the discharge side of the pump to the bearings and against the intermeshing gear wheels, the rotation of the latter serving to set up a spray of lubricant, and means for effecting cooling of the lubricant located in the path of the spray.

3. In a gearing, the combination of a casing adapted to contain a supply of lubricant in the bottom thereof, intermeshing gear wheels mounted in the casing above the lubricant level, bearings for the gear wheels, walls supported on the bottom of the casing which form a chamber communicating with the casing interior below the lubricant level, a lubricant pump mounted on said walls and having its suction side connected with the chamber, a conduit connected with the discharge side of the pump, means forming passages for conveying lubricant from the conduit to the bearings, means connected with the conduit for directing a stream of lubricant therefrom against the intermeshing gear wheels in a direction to cause a spray of lubricant to be set up by their rotation, and means for effecting cooling of the lubricant located in the path of the spray.

4. In combination, a casing adapted to contain lubricant, a gearing mounted therein, said gearing being arranged to create a spray of lubricant when in operation, a lubricant pump mounted on the bottom of the casing and having its suction side communicating directly with the casing, means forming conduits which connect the discharge side of said pump to points in the gearing requiring lubrication, means for driving said pump from said gearing, and means within said casing above the lubricant level and in the path of the lubricant spray for effecting cooling of the lubricant.

5. In a self-oiling gearing, the combination with a casing and power transmitting gear wheels therein, of walls supported on the bottom of the casing which form a chamber which communicates with the casing, a lubricant pump mounted on said walls and having its suction side connected to said chamber, walls forming a conduit which extends across the casing, a conduit connecting the discharge side of the pump to said first-named conduit, a pressure relief valve for said first-named conduit which is connected therewith to discharge into the casing, means for driving the pump directly from the gear wheels, and means forming passages for conveying lubricant from said first-named conduit to parts requiring lubrication.

In witness whereof, I have hereunto set my hand this 26th day of May, 1923.

AUBREY A. ROSS.